(12) United States Patent
Milvich

(10) Patent No.: US 7,239,130 B1
(45) Date of Patent: Jul. 3, 2007

(54) COMPACT PITCH-COMPENSATED INDUCTIVE DISPLACEMENT TRANSDUCER

(75) Inventor: Michelle Mary Milvich, Seattle, WA (US)

(73) Assignee: Mitutoyo Corporation, Kawasaki-Shi (JP)

( * ) Notice: Subject to any disclaimer, the term of this patent is extended or adjusted under 35 U.S.C. 154(b) by 0 days.

(21) Appl. No.: 11/492,366

(22) Filed: Jul. 24, 2006

(51) Int. Cl.
*G01B 7/14* (2006.01)

(52) U.S. Cl. .......................... 324/207.15; 324/207.12; 324/207.17

(58) Field of Classification Search ........... 324/207.12, 324/207.15, 207.17, 207.24; 336/45; 341/15; 340/870.31
See application file for complete search history.

(56) References Cited

U.S. PATENT DOCUMENTS

| 4,959,615 | A | 9/1990 | Andermo |
| 5,804,963 | A | 9/1998 | Meyer |
| 5,841,274 | A | 11/1998 | Masreliez et al. |
| 5,886,519 | A | 3/1999 | Masreliez et al. |
| 5,998,990 | A | 12/1999 | Andermo et al. |
| 6,005,387 | A | 12/1999 | Andermo et al. |
| 6,011,389 | A | 1/2000 | Masreliez et al. |
| 6,124,708 | A | 9/2000 | Dames |
| 6,329,813 | B1 | 12/2001 | Andermo |
| RE37,490 | E | 1/2002 | Andermo et al. |

FOREIGN PATENT DOCUMENTS

WO     WO 97/19323 A1     5/1997

*Primary Examiner*—Bot LeDynh
(74) *Attorney, Agent, or Firm*—Christensen O'Connor Johnson Kindness PLLC

(57) ABSTRACT

An induced current position transducer reduces spatial phase errors associated with layout constraints. Each winding of the transducer comprises a set of loops arranged in hypothetical basic polarity zones that alternate along the measuring axis and a set of loops arranged in hypothetical offset polarity zones that are offset from the basic polarity zones along the measuring axis. Hypothetical offset zones are defined at positions where basic and offset polarity zones that have opposite polarities overlap. Due to layout constraints, each winding may have an offset zone including an unbalancing coupling area that differs from the coupling area in the majority of offset zones. The windings are configured such that the amount of unbalanced coupling area included in the offset zones of each respective winding is approximately the same for each of the windings, making their respective phase errors approximately the same.

23 Claims, 10 Drawing Sheets

COMPACT PITCH-COMPENSATED INDUCTIVE DISPLACEMENT TRANSDUCER

FIELD OF THE INVENTION

This invention relates to sensing the displacement between two members by means of an induced current position transducer that compensates certain potential signal errors.

BACKGROUND OF THE INVENTION

Inductive position measuring transducers generally comprise transmitter coils, receiver coils, and scale elements. The transmitter and receiver coils may be planar, and arranged on fixed parallel planes, as in a printed circuit board. In some transducers, the transmitter and receiver coils together are called the "readhead." The scale elements may also be planar and can be coils, bars, or some other shape. Generally the scale elements may alter the magnetic coupling between the transmitter and receiver coils. Generally, the readhead is positioned so that the transmitter and receiver coil planes are parallel to the scale plane. The readhead is movable relative to the scale along the measuring direction. A more complete description of various exemplary prior art inductive transducers can be found in U.S. Pat. Nos. 5,886,519, 6,011,389, RE37,490, U.S. Pat. No. 6,005,387, and U.S. Pat. No. 6,329,813, each of which is hereby incorporated by reference in its entirety.

In such inductive transducer systems, the measurement error of the device generally increases if the alignment between the readhead and scale is not ideal. In particular, a non-zero pitch angle generally leads to imbalances in the signal contributions of various loops of the receiver coils, which is undesirable. An exemplary pitch-compensated transducer that exhibits reduced errors due to pitch misalignment is described in U.S. Pat. No. 5,998,990, (the '990 patent), which is hereby incorporated by reference in its entirety.

One error contribution that can occur due to pitch misalignment is a net imbalance in the signal contributions from the positive and negative loops within a single receiver winding. In order to address related error contributions, the '990 patent teaches a pitch-compensating technique involving flux coupling areas. The '990 patent illustrates planar, spatially modulated, receiver windings that are "twisted" to define effective flux coupling loop areas that alternate their polarity along the measuring axis direction, such that alternating loops provide signal contributions having opposite signs. The '990 patent teaches that the resulting flux coupling areas may be described as being distributed relative to a plurality of hypothetical half-wavelength long polarity zones that alternate in polarity along the measuring axis, corresponding to the scale structure, and corresponding to the alternating polarity of adjacent loops in a receiver coil. The '990 patent teaches that in some pitch-compensated readheads, a receiver winding may have at least one pitch-balancing section designed such that the centroid location, or centroid "axis," of the effective flux coupling areas making positive polarity contributions to the receiver coil output signal is aligned with the centroid axis of the effective flux coupling areas making negative polarity contributions to that receiver coil output signal. Each spatially modulated section of a receiver coil of the pitch-compensated readhead thus has a defined centroid axis lying in a plane perpendicular to the measuring axis with its location along the measuring axis defined as follows: The location of the centroid axis is defined such that when each incremental portion of all flux coupling areas is multiplied by the signed distance from that incremental portion to the centroid axis, the sum of all such products equals zero. The total effective flux coupling area of the two polarities may also be equal. As a result, a DC signal offset error component may be approximately zero.

However, the foregoing technique, in itself, does not necessarily align the centroid axes of all the various receiver coils, as is most desirable for additional pitch compensation. The '990 patent discusses in detail various types of "pitch error" contributions that can occur in devices which have multiple receiver windings that are generally offset from each other by a spatial phase shift along the measuring axis direction. The '990 patent teaches that if two receiver windings are identical but offset from each other in the measurement direction, then a pitch misalignment brings one receiver winding, on average, closer to the scale than the other receiver winding. Various error contributions may result. For example, the scale is intended to modulate an output signal from each receiver winding, and generally a modulation amplitude mismatch (signal amplitude mismatch) will be created when one receiver winding is closer to the scale (producing a stronger modulation) and another receiver winding is farther from the scale (producing a weaker modulation). This pitch-sensitive signal mismatch may contribute to measurement errors.

In one method for addressing such errors, the '990 patent discloses examples using "multiple loops" (e.g., doubled loops, tripled loops, etc.). In its explanation, in FIG. 20 the '990 patent first shows three windings having a tripled loop configuration wherein the centroids of the various windings are not aligned. The three windings provide three similar signals that have three different spatial phases. That configuration is not pitch compensated for signal amplitude mismatch between windings. Then, in FIG. 21, a configuration is shown that provides similar signals, but that is pitch compensated for signal amplitude mismatch between windings. This is achieved by "rearranging" various loops in the various windings into combinations of single, double and triple loops in various polarity zones, such that the centroids of all the windings are aligned while their desired spatial phases are maintained. Ideally, aligning the centroids effectively cancels the pitch-sensitive mismatch of the signal modulation amplitude between the three windings. Although the relative strengths of the two signal polarity contributions is not necessarily pitch-compensated within a winding for the configuration described with reference to FIG. 21, maintaining pitch-compensated winding-to-winding signal amplitude matching may be the dominant design consideration under many circumstances and, therefore, this type of pitch compensation technique is desirable in various embodiments.

In summary, FIG. 21 illustrates one embodiment of a method for aligning centroids in a multiple loop embodiment to form a pitch-compensated readhead. However, importantly, only an idealized implementation is illustrated, in that the techniques required in a practical implementation for connecting the multiple loops of an individual winding together to form a single output signal are not discussed or addressed. As described further below, in practice, connection fabrication constraints are a dominant design consideration in many applications.

In its embodiments of pitch-compensated readheads, the '990 patent also shows one example of how various portions of a winding may be coupled to one another. As described with respect to FIG. 15, the '990 patent states that first and second receiver windings each have parts for connecting the windings together which are shown as exterior portions extending outside of the transmitter windings. Each of the exterior portions are stated to include two wires that overlay each other to avoid forming a loop. Because the exterior portions do not form loops, it is intended that no signal be generated in these portions by the changing magnetic flux. This solution may be undesirable in certain implementations for a number of reasons, including layout and electrical complications, and increased readhead size. It also does not address the issue of how to form practical connections between multiple closely spaced loops such as those shown in FIG. 21 of the '990 patent.

U.S. Pat. No. 6,124,708, which is hereby incorporated herein by reference in its entirety, discloses a pitch compensated quadrature-type transducer using sets of doubled loops, and also shows a practical method for connecting sets of doubled loops near the edges of two quadrature windings. However, connecting sets of loops near the edges of a winding is a design constraint that may be impractical in various applications. In addition, the pitch-compensation teachings of the '708 patent are difficult or impossible to apply to three phase inductive transducers. Winding configurations which solve any or all of the problems outlined above would be desirable.

SUMMARY OF THE INVENTION

Certain inductive transducer windings include sets of "multiple loops" (e.g., sets of doubled loops, tripled loops, etc.) for pitch compensation and other purposes. Some examples of such designs are illustrated in the '990 and '708 patents as discussed above. However, the '990 and '708 patents both fail to recognize various problems and error contributions that may arise in association with various practical fabrication constraints. One problem that occurs in windings that include sets of multiple loops is that the connections (e.g., the links) that are required in order to provide a single output signal from each winding require a certain amount of fabrication area and clearance from adjacent traces, etc. The associated deviations from ideal theoretical loop configurations introduce offset, amplitude, and phase shifts. In other words, the shapes of the connections as they can be formed in practical implementations alter the shapes of the loops that could otherwise be formed in an ideal configuration, which leads to offset, amplitude, and phase shifts. These practical problems become particularly significant when transducer spatial wavelengths and the associated loops are made smaller, which is generally required for improved measurement resolution and accuracy. The dimensions of circuit traces, insulating spaces, inter-layer feedthroughs, etc., then become significant relative to the wavelength, and winding layout design choices are severely constrained. As a result, transducer accuracy may be compromised.

It should be appreciated that the state-of-the-art in inductive transducers is to provide measurement resolution and/or accuracy that may be on the order of $1/1000$ of the transducer wavelength, or even less. This requires nearly ideal (sinusoidal) outputs signals from each receiver winding, so that appropriate signal processing may provide sub-wavelength measurement signal interpolation with the required accuracy. Thus, to advance the state-of-the-art, this invention provides novel winding layout configurations that overcome small but significant errors contributions that may otherwise arise in association with various "non-ideal" winding layout features.

Errors related to signal offset and signal amplitude mismatches can in some cases be compensated by relatively simple signal processing operations. However, determining and correcting for improper spatial phase relationships between the windings is relatively more complex and may not be feasible in a variety of applications, particularly in hand tool applications (e.g., calipers), due to limitations in signal processing speed, memory, and/or power. Therefore the performance (i.e., the degree of conformance of the resulting signals to the ideal sinusoidal shape and the ideal spatial phase difference between the signals) of an inductive transducer may typically be limited by the relative spatial phase errors between multiple windings of the transducer. This invention addresses such spatial phase errors, also referred to herein simply as phase errors and especially such phase errors that may otherwise be associated with the effects of practical layout constraints.

A pitch-compensated induced current position transducer is provided that includes a plurality of windings, wherein each winding includes a first set of plus and minus polarity loops arranged to correspond to a plurality of hypothetical basic polarity zones that alternate in polarity along the measuring axis at a scale wavelength, and a second set of plus and minus offset polarity loops arranged to correspond to a plurality of hypothetical offset polarity zones that are offset from the basic polarity zones along the measuring axis direction by an offset dimension that is less than half the scale wavelength. Furthermore, hypothetical offset zones may be defined along the entire length of each respective winding at positions along the measuring axis direction where a basic polarity zone overlaps with an offset polarity zone having the opposite polarity. In accordance with one aspect of the invention, for each winding a conductive portion of the winding that forms the first set of loops is connected to a conductive portion of the winding that forms the second set of loops by a series connection, and for each of the plurality of windings, at least a first offset zone includes a first coupling area shape that is different from a coupling area shape included in a majority of the offset zones of that winding, and the plurality of windings is configured such that the net amount of unbalanced coupling area included in the respective offset zones of each respective winding is approximately the same for each of the plurality of windings and the resulting phase error is approximately the same for each of the plurality of windings.

In accordance with another aspect of the invention, in some embodiments, the net amount of unbalanced coupling area in the respective offset zones of each respective winding may differ between windings by at most one-eighth of the largest portion of any single loop area that is included in an offset zone of any one of the windings.

In accordance with another aspect of the invention, in some embodiments, the shape of the unbalanced coupling area in each of the respective windings is geometrically congruent between the windings.

In accordance with another aspect of the invention, in some embodiments, the net amount of unbalanced coupling area in the respective offset zones of each respective winding may be approximately zero.

In accordance with another aspect of the invention, in some embodiments, the unbalanced coupling area of one of the plurality of windings may be located in an offset zone that is adjacent to a polarity zone of that winding that includes a majority of the coupling area of two loops, and the unbalanced coupling area may be located along the measuring axis in a first direction relative to the two loops. Each of the other windings of the plurality of windings may then also include an unbalanced coupling area that is located in an offset zone that is adjacent to a polarity zone of that winding that includes a majority of the coupling area of two loops, and that unbalanced coupling area may also be located along the measuring axis in the first direction relative to the two loops.

In accordance with another aspect of the invention, in some embodiments, at least one of the windings includes a shifting arrangement in one its offset zones that includes no coupling area.

In accordance with another aspect of the invention, in some embodiments, at least one of the windings includes a shifting arrangement that includes coupling area of a single polarity in one of its offset zones. In accordance with a further aspect of the invention, the coupling area of the single polarity may balance a coupling area of the opposite polarity in an offset zone that is an integer number of wavelengths away.

In accordance with another aspect of the invention, in some embodiments, at least one of the windings may include a compensating single-loop distortion in one its offset zones that balances an unbalanced coupling area in an offset zone that is an integer number of wavelengths away.

In accordance with another aspect of the invention, in some embodiments, in each winding, all polarity zones that each contain the majority of the coupling area of two loops may be located adjacent to one another.

In accordance with another aspect of the invention, in some embodiments, the number of members in the basic set of loops may be the same for each of the plurality of windings, and the number of members in the offset set of loops may be the same for each of the plurality of windings. In accordance with a further aspect of the invention, in some embodiments, the number of members in the basic set of loops may also the same as the number of members in the offset set of loops.

In accordance with another aspect of the invention, in some embodiments, each winding may include a first group of polarity zones that each contain the majority of the coupling area of two loops and that are located adjacent to one another, and at least one other of the polarity zones that contains the majority of the coupling area of two windings may be separated from the first group of polarity zones by at least one polarity zone that does not include the majority of the coupling area of two windings.

In accordance with another aspect of the invention, in some embodiments, each winding may include two serial connection arrangements in its offset zones that are configured as mirror images of one another. In accordance with a further aspect of the invention, in some embodiments, the two serial connection arrangements that are configured as mirror images of one another are in offset zones that are an integer number of wavelengths apart.

In accordance with another aspect of the invention, an offset dimension between the basic polarity zones and the offset polarity zones may be one-tenth of the scale wavelength.

In accordance with another aspect of the invention, the plurality of windings may consists of N windings that provide respective output signals having relative spatial phases that differ by (360/N) degrees, wherein N is an integer that is at least two. In accordance with a further aspect of the invention, in some embodiments, N=3.

In accordance with another aspect of the invention, in various embodiments, the plurality of windings may be configured such that the centroids of each of the plurality of windings are approximately aligned at the same location along the measuring axis direction.

In accordance with another aspect of the invention, in some embodiments, each of the plurality of windings includes portions that are connected by feedthroughs that have a minimum feedthrough size dimension parallel to the plane of the winding, and the scale wavelength may be at most 15 times that minimum feedthrough size dimension. In accordance with a further aspect of the invention, in some embodiments, the scale wavelength may be at most 10 times the minimum feedthrough size dimension.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

When producing a pitch-compensated readhead, one important reason for using multiple (e.g., doubled) loops or "skipped" loops is that the polarity zones with the multiple loops or skipped loops will have a total flux coupling area that is different from the total flux coupling area in adjacent polarity zones with only single loops. This allows the centroid axis of a winding to be shifted, to align with the centroid axis of another winding, while also providing the desired spatial phase. In cases where a compact (i.e., short) receiver design is desired, pitch compensation is achieved with multiple loops (e.g., doubled) rather than skipping loops. Utilizing multiple loops leads to a smaller area occupied on the readhead PCB for the same number of loops per receiver and does not require additional metal layers. It will be appreciated that for the multiple loops any number of loops (doubled, tripled, etc.) can be used for achieving the centroid balancing described in the '990 patent, provided that the required layout can be achieved using practical fabrication constraints.

As a practical matter, the connections (e.g., links) between the main loops and the multiple or skipped loops require a certain amount of fabrication area and clearance from adjacent traces, etc., and the associated deviations from the ideal theoretical loop configuration may introduce offset, amplitude, and phase shifts. Offset and amplitude mismatch can in some cases be compensated by software. However, determining and compensating for phase error is more complex, and thus the performance (i.e., the degree of conformance of the resulting signals to the ideal sinusoidal shape and the ideal spatial phase difference between the signals) of an inductive transducer of this type is in some embodiments mostly limited by phase error. As will be described in more detail below, as one example FIG. 1 will first illustrate an ideal configuration that produces signals with a nearly ideal sinusoidal shape and an "ideal" spatial phase. Then, in the remainder of the description, FIGS. 2-8 will show practical configurations which illustrate and address potential error sources associated with sets of multiple loops and their interconnections.

Figure 1:
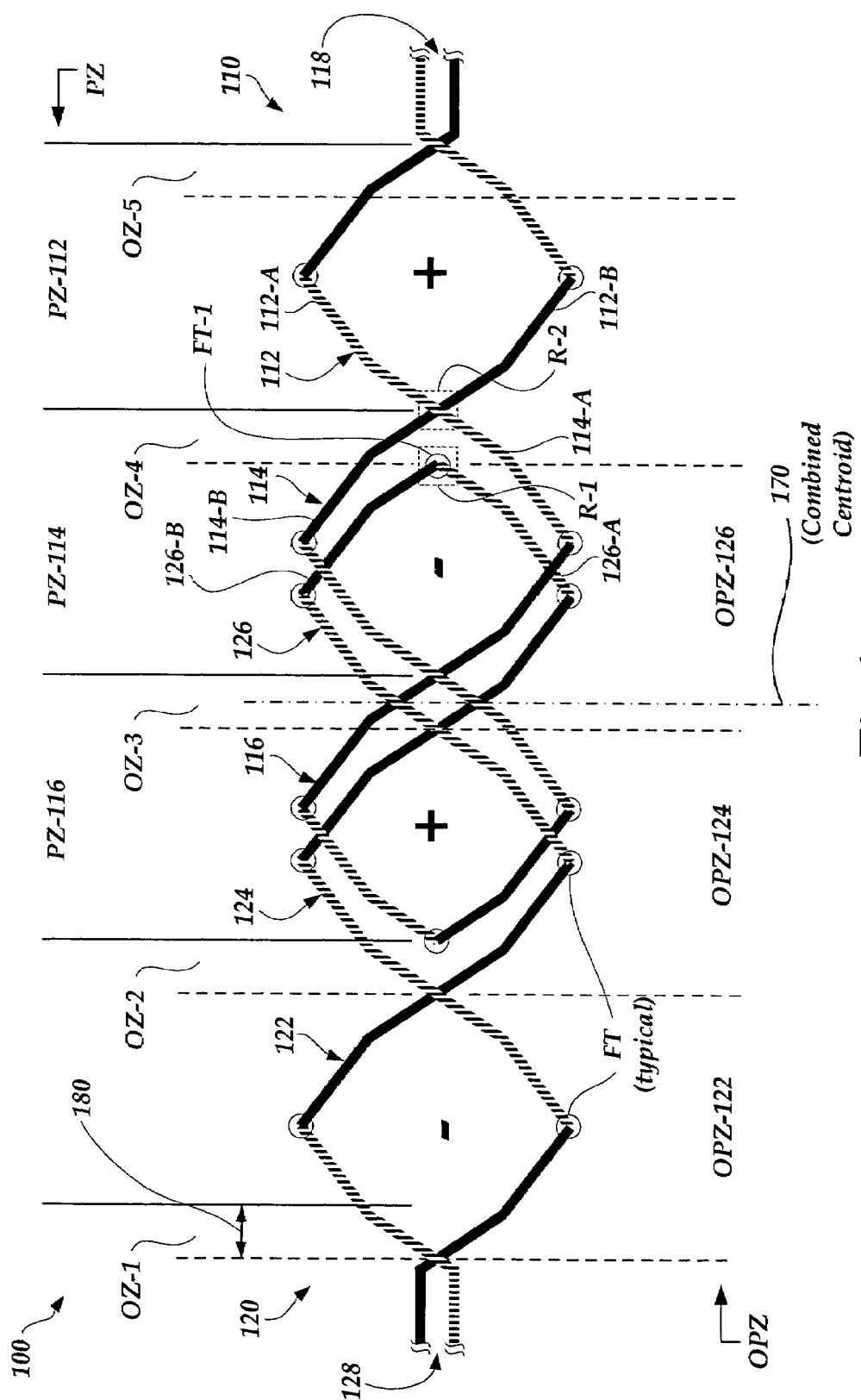
FIG. 1 is a plan view of an idealized transducer winding with a set of doubled loops, two subwindings, and four output terminals.
Figure 2:
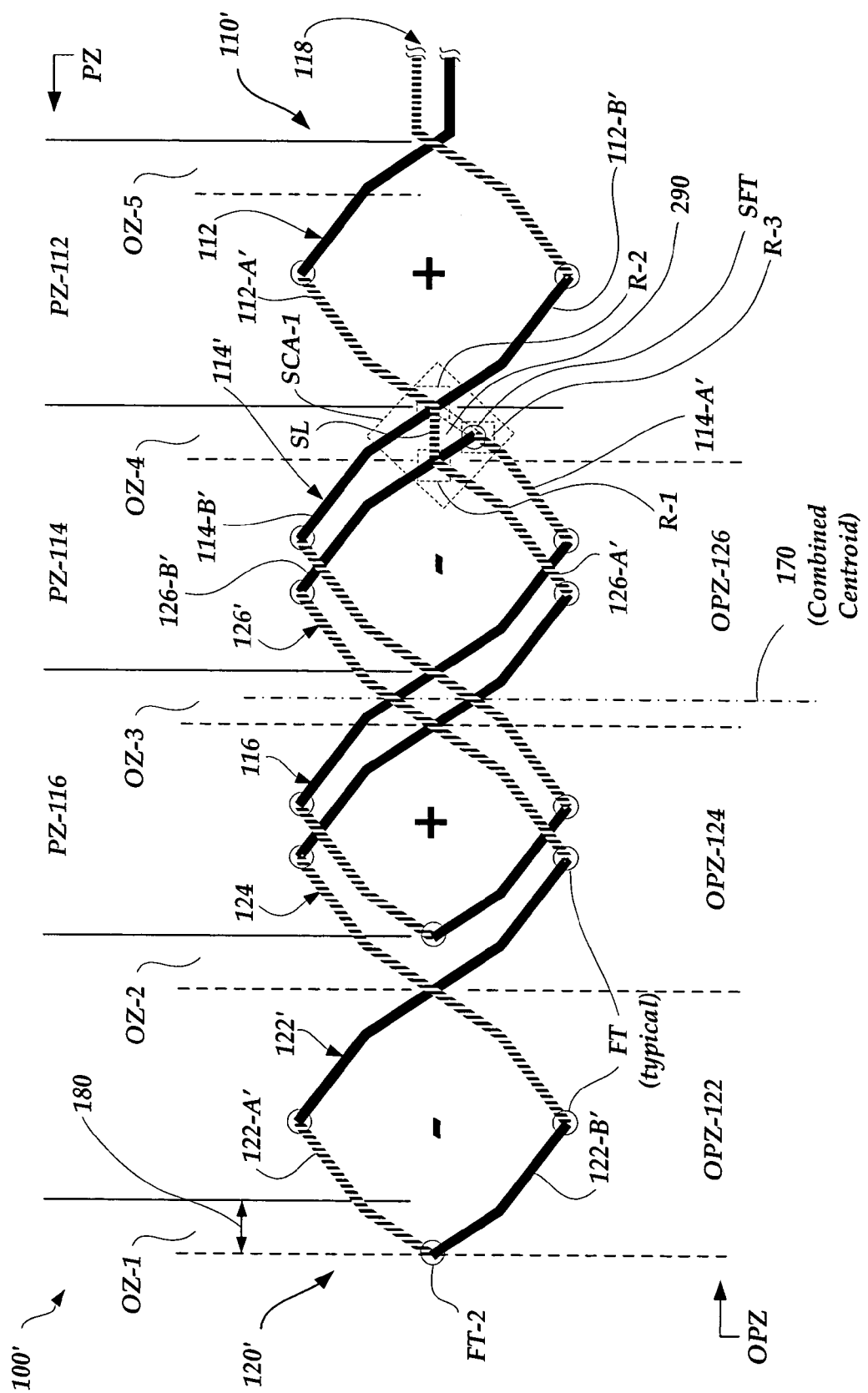
FIG. 2 is a plan view of a practical transducer winding with a set of doubled loops and two output terminals.

FIG. 1 is a diagram of an idealized transducer winding 100 with doubled loops and four output terminals. As will be described in more detail below, the idealized configuration of the winding 100 will be contrasted with a practical configuration of a winding 100' of FIG. 2. In FIG. 1 and FIG. 2, the conductor elements illustrated with dashed lines are insulated from the conductor elements illustrated with solid lines (e.g., printed circuit board conductors separated by an insulating layer), except where they are connected by conducting feedthroughs FT, which are illustrated as small circles throughout all figures herein.

As shown in FIG. 1, the transducer winding 100 is formed with, a first basic set of loops 110 and a second offset set of loops 120. The basic set of loops 110 has an output 118 with two terminals on the right end, and the offset set of loops 120 has an output 128 with two terminals on the left end. The output signal of the transducer winding 100 is provided by external summation of the outputs 118 and 128. The basic set of loops 110 includes loops 112, 114, and 116, which extend along a measuring axis with a pitch corresponding to a scale wavelength. The offset set of loops 120 includes loops 122, 124, and 126, which also extend along the measuring axis with a pitch corresponding to the scale wavelength. The loops of the basic set of loops 110 are offset from the loops of the offset set of loops 120 by an offset dimension 180. The offset dimension 180 is generally less than one half the scale wavelength and is at least sufficient to provide the clearance required for various feedthroughs FT, including at least the minimum fabrication spacing required between adjacent conductors (e.g., on an etched metal layer of a printed circuit board or thin-film device). The winding 100 includes a pair of doubled loops. The loops 114 and 126 form a first doubled loop and the loops 116 and 124 form a second doubled loop.

For convenient reference further below, certain conductor portions that form the loops 112, 114, and 126 are marked as the conductor portions 112-A and 112-B, 114-A and 114-B, and 126-A and 126-B, respectively. Regions R-1 and R-2 are also indicated in FIG. 1, and are discussed further below.

A series of basic polarity zones PZ and offset polarity zones OPZ are indicated in FIG. 1. As described in the '990 patent, "polarity zones" (e.g., the basic polarity zones PZ and the offset polarity zones OPZ) can be thought of as mental constructs useful in analyzing and describing a pitch-compensated transducer layout. In a manner corresponding to the structure of a scale used in conjunction with a winding, the polarity zones periodically alternate between positive and negative polarity along the measuring axis and have a length and pitch corresponding to the scale wavelength. The positive polarity zones of a spatially modulated flux receiver (or flux generator) include winding loops that all make a positive polarity contribution to the output signal. The negative polarity zones include winding loops that all make a negative polarity contribution to the output signal.

For the offset set of loops 120, the loops are distributed in the offset polarity zones OPZ, marked by dashed vertical lines. For the basic set of loops 110, the loops are distributed in the basic polarity zones PZ, marked by solid vertical lines. For the basic set of loops 110, the loops 112 and 116 are positive polarity loops, while the loop 114 is a negative polarity loop. For the offset set of loops 120, the loops 122 and 126 are negative polarity loops, while the loop 124 is a positive polarity loop. The offset polarity zones OPZ are offset from the basic polarity zones PZ by the offset dimension 180.

As taught in the '990 patent, the location of the centroid axis along the measuring axis is defined such that when each incremental portion of all flux coupling areas is multiplied by the signed distance from that incremental portion to the centroid axis, the sum of all products equals zero. In the simple symmetric case shown in FIG. 1, the combined centroid 170 falls at the geometric center of the winding 100. As previously described, in order to eliminate the pitch-induced signal amplitude mismatch error and achieve high accuracy, it is desirable to position the multiple windings of a readhead such that they have centroid axes that are aligned at the same location along the measuring axis, while their appropriate spatial phase differences are maintained.

For purposes of explanation, it is convenient to define a set of "offset zones" OZ, as shown in FIG. 1. Offset zones OZ-1 through OZ-5 are indicated in FIG. 1. More generally, the offset zones OZ may continue periodically along the measuring direction, similarly to the basic polarity zones PZ and offset polarity zones OPZ. The hypothetical offset zones OZ may be defined at positions along the measuring axis direction where a basic polarity zone PZ overlaps with an offset polarity zone OPZ that has the opposite polarity.

It will be appreciated that the winding 100 is characterized as an "ideal" winding because all of the winding loops are identical. Thus, they provide the ideal or desired coupling area shape in all of the basic polarity zones PZ, all of the offset polarity zones OPZ, and all of the offset zones OZ. Accordingly, ideally, the spatial phase of the winding 100 may be taken to be the average of the spatial phase of the basic polarity zones and the spatial phase of the offset polarity zones.

FIG. 2 is a plan view of a practical transducer winding 100' with doubled loops and two output terminals. The similarly-numbered components of the winding 100' are analogous to those of the winding 100, except as described below. As shown in FIG. 2, the winding 100' differs from the winding 100 in that it has only two output terminals (at the output 118) at the right end of the winding 100'. This configuration is more practical for actual implementation, in terms of electronic error sources and other issues (e.g., when attempting to connect the additional output terminals of a winding such as the winding 100 there is additional stray inductance and capacitance involved which tend to introduce additional errors, in addition to the increase in layout complexity, etc.)

In order to eliminate the need for output terminals on the left end, in the winding 100' the conductor portions 122-A' and 122-B' of the loop 122' have been connected at the feedthrough FT-2 and the offset set of loops 120' and the basic set of loops 110' have been connected in series in the offset zone OZ-4, as described in greater detail below. More specifically, comparing FIG. 2 to FIG. 1, in essence a break has been made in the basic loop 114' between regions R-2 and R-3, and a series link SL has been added from the offset loop 126' (region R-1) to the basic loop 112' (region R-2). Furthermore, the feedthrough FT-1 has been eliminated in the region R-1, and the conductive portion 126-B' crosses over the conductive portion 126-A' at an insulated crossover in region R-1 to connect to the conductive portion 114-A' at the serial connection feedthrough SFT in region R-3.

Figure 5:
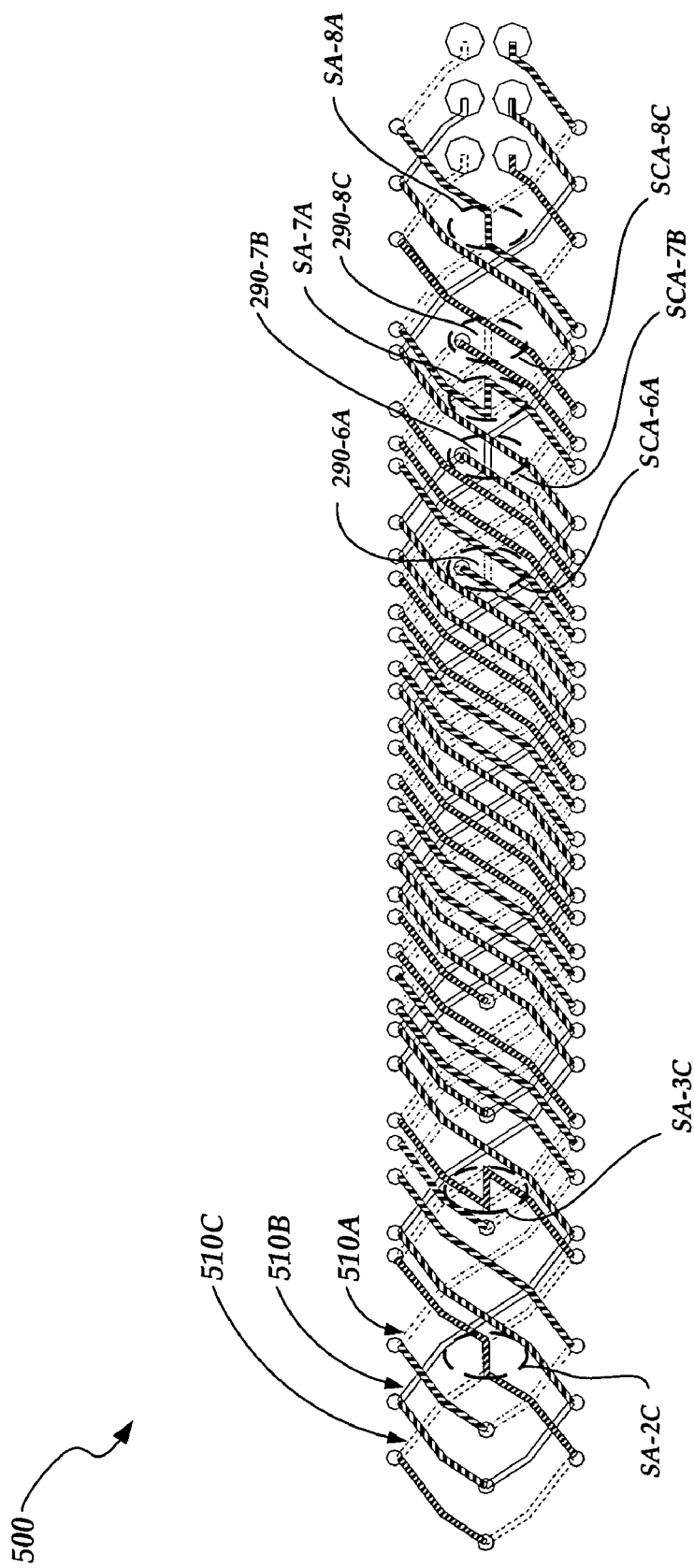
FIG. 5 is a plan view of a set of practical transducer windings for a three-phase system according to this invention, with a set of doubled loops in each of the windings.
Figure 7:
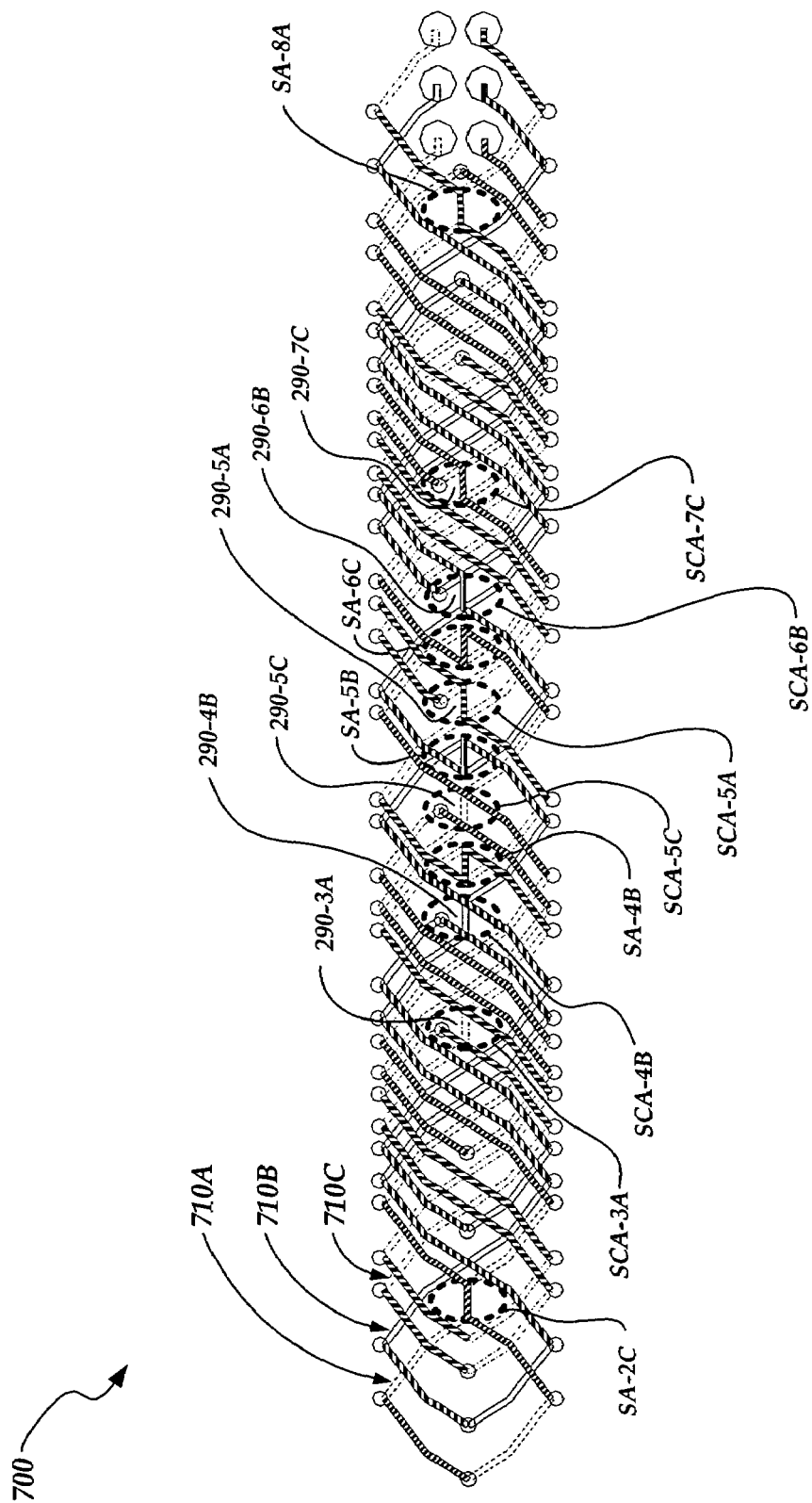
FIG. 7 is a plan view of a practical set of transducer windings for a three-phase system according to this invention, with two sets of doubled loops in each of the windings.

It will be appreciated that in one specific embodiment the various features of the diagram of FIG. 2 is shown "true-to-scale," in that the sizes of the feedthroughs, conductive trace widths, clearances between conductive traces, loop sizes, and the like are depicted approximately realistically relative to one another and according to practical fabrication constraints. Accordingly, in various embodiments, the various series connection features are constrained to approximately the series connection region SCA-1, proximate to the offset zone OZ-4, because this is a region where they will not interfere with adjacent conductors that may be present when a different winding having a different spatial phase is aligned with the winding 100' in a multi-phase transducer (e.g., a two-phase quadrature type transducer, or a three-phase transducer), as illustrated in FIGS. 3, 5, and 7.

Comparing FIG. 2 to FIG. 1, it will be appreciated that "negative polarity" coupling area has been lost in discrepancy area 290 in the offset zone OZ-4 and that the coupling area shape in the offset zone OZ-4 is not the ideal or desired coupling area shape that is present in the majority, or all, of the other offset zones. Accordingly, the different coupling area shape in the offset zone OZ-4 creates an unbalanced coupling area in the offset zones that will create a small phase error in the signal from the winding 100'. Stated another way, the spatial phase of the winding 100' includes a phase error in the sense that it is not the average of the spatial phase of the basic polarity zones and the spatial phase of the offset polarity zones, but is slightly shifted from that ideal spatial phase due to the location, shape and size of the discrepancy area 290. As previously indicated, the performance of a transducer may typically be limited by the conformance of the position signal from a winding to the ideal sinusoidal shape and the ideal spatial phase that is expected from that winding. The coupling area discrepancy in the offset zone OZ-4 will cause both of these characteristics to deviate from the ideal case. However, as will be described in more detail below with reference to FIGS. 3-7, certain design principles may be utilized with regard to various practical connections features between loops so as to reduce phase errors in a winding.

Figure 3:
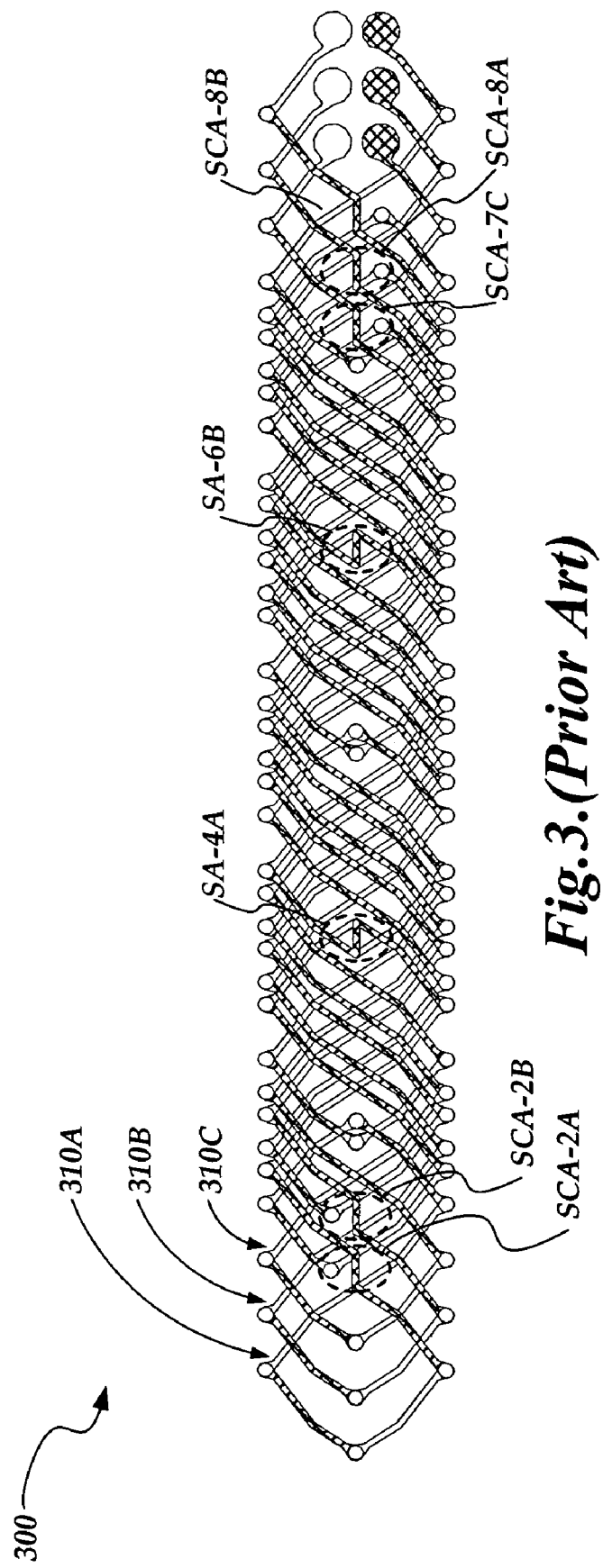
FIG. 3 is a plan view of a set of practical transducer windings used in a prior art pitch compensated three-phase system that includes certain spatial phase errors.

FIG. 3 is a plan view of a practical set of transducer windings 300 used in a prior art pitch-compensated three-phase transducer readhead. In particular, the set of windings 300 is substantially similar to one portion of an inductive transducer readhead used in various absolute-type calipers that are commercially available from Mitutoyo America Corporation (MAC), located in Aurora, Ill.

The set of windings 300 includes windings 310A, 3101B, and 310C. In accordance with the three-phase configuration, the windings 310A, 310B, and 310C are offset from one another by one-third of a scale wavelength and thus produce three-phase signals, which are used together for position determination. The set of windings 300 includes subtle spatial phase errors, discussed below.

Figure 4:
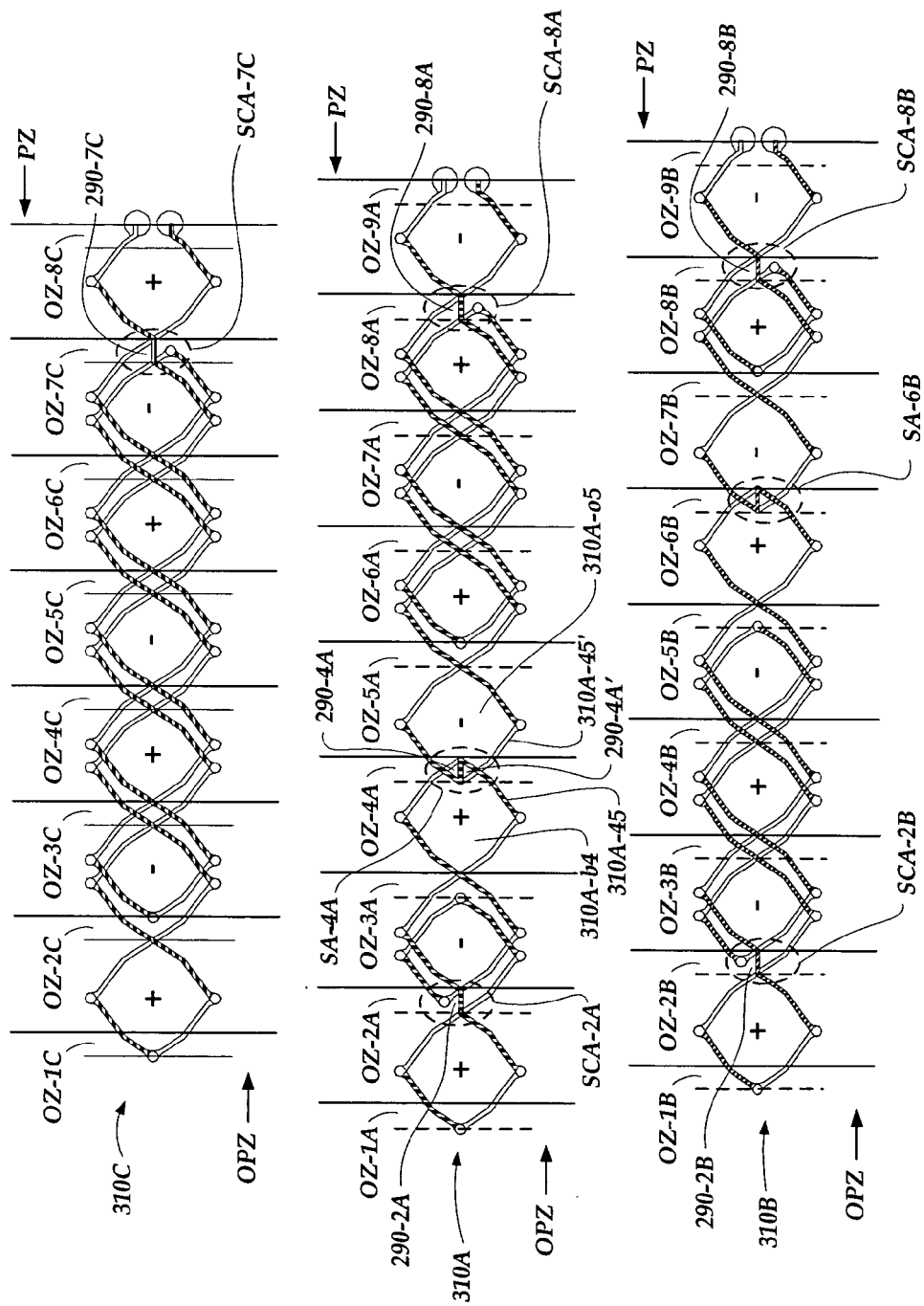
FIG. 4 is a plan view of the three windings of FIG. 3, showing each individually.

FIG. 4 is a plan view of the three windings 310A-310C of FIG. 3, showing each individually. In considering phase error contributions, for the windings shown in FIGS. 3 and 4, we may restrict our attention to the offset zones, since each of the windings includes a basic loop set of six loops balanced against an offset loop set of six loops, and all deviations from the "ideal" or standard loop shape for the set of windings 300 are located in the offset zones.

In particular, in winding 310C, offset zones OZ-3C through OZ-6C each include a standard shaped portion of a +loop balanced against a standard shaped portion of a −loop and ideally contribute no phase error. Offset zone OZ-2C includes a standard-shaped portion of a −loop, and may be considered to be balanced against the standard-shaped portion of a +loop in offset zone OZ-8C. The + and −loop shapes in the combination of offset zones OZ-2C and OZ-8C ideally contribute no phase error because they are located precisely an integer number of scale wavelengths apart, and thus contribute to the output signal as though they were collocated, thus balancing each other. Offset zone OZ-1C includes a standard shaped portion of a +loop and may be considered to be partially balanced against the irregularly-shaped subportion of a −loop in offset zone OZ-7C, which is located an integer number of wavelengths away. However, offset zone OZ-7C includes a net coupling area shape that is different from the shape of the standard loop portions in the other offset zones. In particular, offset zone OZ-7C is missing a −loop coupling area 290-7C, analogous to the area 290 previously described with reference to FIG. 2. Thus, it will be appreciated that the different shape and lost discrepancy area 290-7C in the offset zone OZ-7C creates an unbalanced coupling area in the offset zones that will create a small phase error in the signal from the winding 310C. Stated another way, the spatial phase of the winding 310C includes a phase error in the sense that it is not the average of the spatial phases of the basic polarity zones and the offset polarity zones, but is slightly shifted from that ideal spatial phase due to the location, shape and size of the discrepancy area 290-7C.

In winding 310A, offset zones OZ-6A and OZ-7A each include a standard shaped portion of a +loop balanced against a standard-shaped portion of a −loop and ideally contribute no phase error. Offset zone OZ-1A includes a standard-shaped portion of a +loop, and may ideally be considered to be balanced against the standard shaped portion of a −loop in offset zone OZ-3A, which is one wavelength away. Offset zone OZ-5A includes a standard shaped portion of a +loop, and may ideally be considered to be balanced against the standard shaped portion of a −loop in offset zone OZ-9A, which is two wavelengths away. Thus, the standard coupling area shapes in the previously described majority of the offset zones of the winding 310A are configured to contribute no phase error.

The offset zone OZ-4A includes a shifting arrangement SA-4A. In particular, the diagonal zigzag conductor portion 310A-45 and the diagonal zigzag conductor portion 310A-45' allow the offset loop 310A-o5 (which lies in an offset polarity zone) to be connected directly to the basic loop 310A-b4 (which lies in a basic polarity zone). Although the shifting arrangement SA-4A includes irregular + and −coupling area shapes, the discrepancy areas 290-4A and 290-4A' are similarly shaped and collocated along the measuring axis direction. Thus, ideally, they balance each other such that the shifting arrangement SA-4A in offset zone OZ-4A is configured to contribute no net phase error. It will be appreciated that the shifting arrangement SA-4A allows the winding 310A to include a basic loop set of six loops balanced against an offset loop set of six loops. Offset zone OZ-8A includes net coupling area shape that is different from the shape of the standard loop portions on the majority of the other offset zones. In particular, offset zone OZ-8A is missing a +loop coupling area 290-8A. Stated another way, the net coupling area within the offset zone OZ-8A is an unbalanced net coupling area, and the total coupling area within that offset zone is less than the largest of any portion of a single loop area that is included in any offset zone of that winding (or any portion of a standard loop area). However, offset zone OZ-2A includes a net coupling area shape that is an inverted image of that shown in offset zone OZ-8A and is missing an equivalent −loop coupling area 290-2A. The inversion of the shape is irrelevant to its signal contribution as a function of displacement along the measuring axis, and the offset zones OZ-8A and OZ-2A are an integer number of wavelengths apart. Thus, it will be appreciated according to previously described principles that the coupling shape and lost discrepancy area 290-8A in the offset zone OZ-8A ideally balances the lost discrepancy area 290-2A in the offset zone OZ-2A such that their combination is configured to contribute no net phase error.

Overall, considering the foregoing analysis, it will be appreciated that the winding 310A includes no net phase error. The configuration of the winding 310B is essentially the same as that of the winding 310A, except that winding 310B is "reversed horizontally" and then "reversed vertically" in comparison to winding 310A. Thus the configuration of the winding 310B may be understood based on the previous description of winding 310A. Ideally, the winding 310B includes no phase error.

In summary, according to the previous analysis of the prior art set of windings 300, the phase error contributed by the discrepancy area 290-7C in the series connection arrangement SCA-7C has not been appreciated and has not been compensated or balanced in any way in the winding 310C. Furthermore, it may be seen that the phase error of the winding 310C is different than the phase error of the windings 310A and 310B and the significance of this has not been appreciated. Therefore, the spatial phases of the three windings relative to one another are not at their expected or ideal values. Thus for at least these reasons, the prior art windings 300 are not configured to provide the best accuracy.

FIG. 5 is a plan view of a practical set of transducer windings 500 used in a pitch-compensated three-phase transducer readhead according to this invention. All of the windings are configured on the same two metal layers, with the "crosshatched" traces on a first layer, the "outlined" traces on a second layer that is generally insulated from the first layer and with the traces of the first and second layers connected at electrical feedthrough connections, which are generally indicated by circular elements throughout FIGS. 5 and 6.

The set of windings 500 includes the three-phase windings 510A, 510B, and 510C, offset from one another by approximately one-third of a scale wavelength and producing three-phase signals that are used for position determination. The set of windings 500 is configured to avoid the subtle spatial phase errors present in the prior art set of windings 300, discussed previously. However, several features of the windings 500 are similar to those discussed previously with reference to similarly designated features in FIGS. 3 and 4, and such features may be understood by analogy with previous descriptions. Therefore, only those features which require additional explanation are described in detail below.

Figure 6:
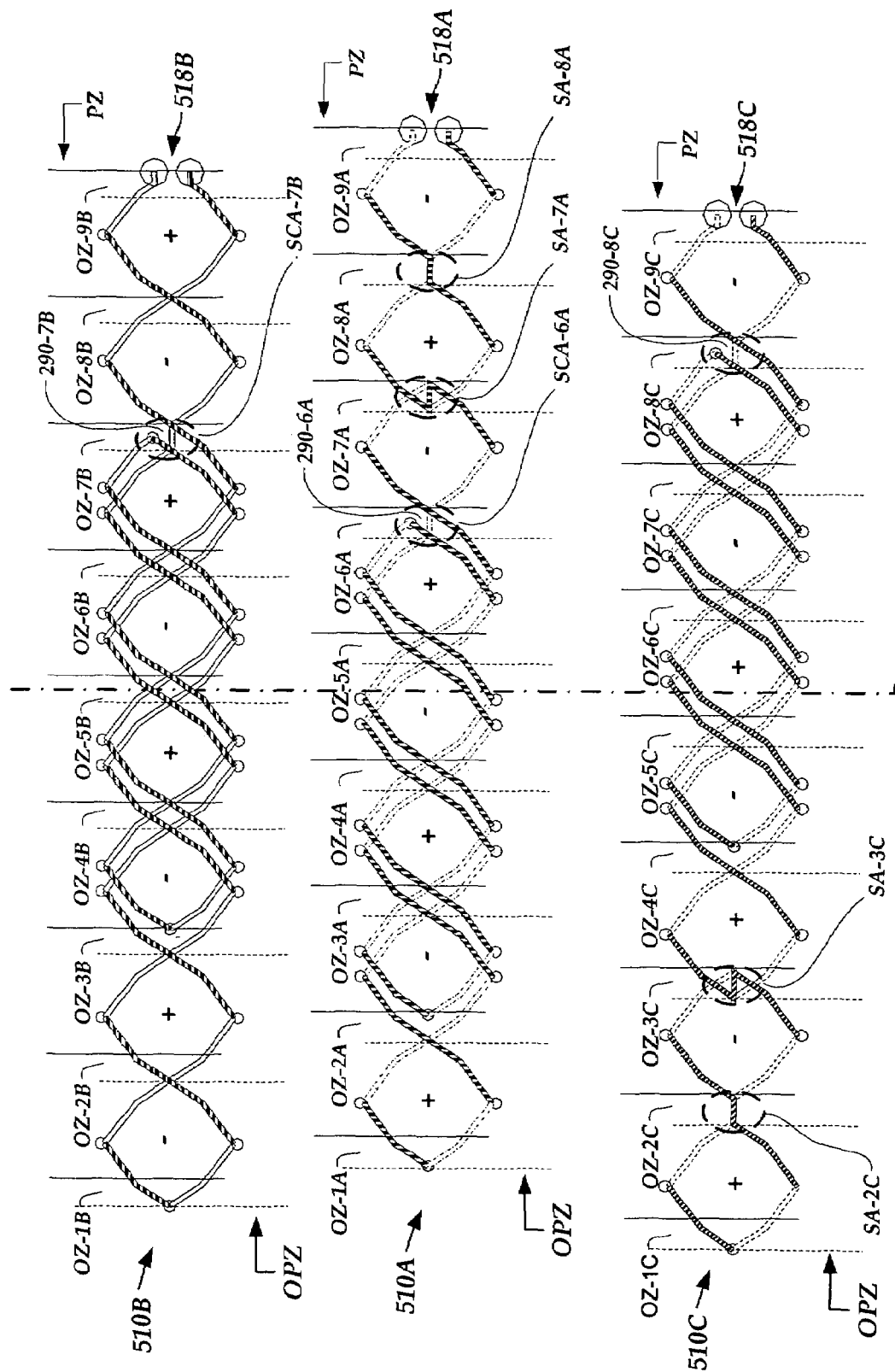
FIG. 6 is a plan view of the three windings of FIG. 5, showing each individually.

FIG. 6 is a plan view of the three windings 510A-510C of FIG. 5, showing each individually. The centroids of all the windings are aligned along the combined centroid axis 570, to provide pitch compensation according to previously described principles. Similarly to the windings 300, in considering phase error contributions, for the windings shown in FIGS. 5 and 6, we may restrict our attention to the offset zones, since each of the windings includes a basic loop set of six loops balanced against an offset loop set of six loops, and all deviations from the "ideal" or standard loop shape for the set of windings 500 are located in the offset zones.

In particular, in winding 510C, offset zones OZ-5C through OZ-7C each include a standard-shaped portion of a +loop balanced against a standard-shaped portion of a −loop, and ideally contribute no phase error. Offset zone OZ-9C includes a standard shaped portion of a−loop and may be considered to be balanced against the standard shaped portion of a +loop in offset zone OZ-1C, because it is located precisely an integer number of scale wavelengths away. The offset zone OZ-3C includes a "self-balancing" shifting arrangement SA-3C, which is similar to the shifting arrangement SA-4A and may be similarly understood to include similarly shaped discrepancy areas of opposite polarity, which are collocated along the measuring axis direction. Thus, ideally, they balance each other such that the shifting arrangement SA-3C in offset zone OZ-3C is configured to contribute no net phase error. The offset zone OZ-2C includes a novel type of shifting arrangement SA-2C. The shifting arrangement SA-2C includes aligned connection traces (one of which is insulated from the other and hidden behind it, as illustrated) that form no coupling area. Therefore, since there is no coupling area, the shifting arrangement SA-2C is "self-balancing" and produces no phase error. The shifting arrangements SA-2C and SA-3C allow the winding 510C to have six basic loops and six offset loops.

Winding 510C further includes in offset zone OZ-4C a standard shaped portion of a −loop, which may be considered to be partially balanced against the irregularly-shaped subportion of a +loop in offset zone OZ-8C, which is located an integer number of wavelengths away. However, offset zone OZ-8C includes a net coupling area shape that is different from the shape of the standard loop portions in the other offset zones. In particular, offset zone OZ-8C is missing a +loop coupling area 290-8C, analogous to the area 290 previously described with reference to FIG. 2. Stated another way, the net coupling area within the offset zone OZ-8C is an unbalanced net coupling area and the total coupling area within that offset zone is less than the largest of any portion of a single loop area that is included in any offset zone of that winding (or any portion of a standard loop area). Thus, it will be appreciated that the different shape and lost discrepancy area 290-8C creates a net unbalanced coupling area in the offset zones that will create a small phase error in the signal from the winding 510C. Stated another way, the spatial phase of the winding 510C includes a phase error in the sense that it is not the average of the spatial phase of the basic polarity zones and the spatial phase of the offset polarity zones, but is slightly shifted from that ideal spatial phase due to the location, shape and size of the discrepancy area 290-8C.

In winding 510A, offset zones OZ-3A through OZ-5A each include a standard shaped portion of a +loop balanced against a standard shaped portion of a −loop and ideally contribute no phase error. Offset zone OZ-9A includes a standard shaped portion of a −loop and may be considered to be balanced against the standard-shaped portion of a +loop in offset zone OZ-1A because it is located precisely an integer number of scale wavelengths away. The offset zone OZ-7A includes a "self-balancing" shifting arrangement SA-7A, which contributes no net phase error, similarly to the previously described shifting arrangement SA-3C. The offset zone OZ-8A includes a "self-balancing" shifting arrangement SA-8A, which contributes no net phase error, similarly to the previously described shifting arrangement SA-2C. The shifting arrangements SA-7A and SA-8A allow the winding 510A to have six basic loops and six offset loops.

Winding 510A further includes in offset zone OZ-2A a standard-shaped portion of a –loop, which may be considered to be partially balanced against the irregularly-shaped subportion of a +loop in offset zone OZ-6A, which is located an integer number of wavelengths away. However, offset zone OZ-6A includes a net coupling area shape that is different from the shape of the standard loop portions in the other offset zones. In particular, offset zone OZ-6A is missing a +loop coupling area 290-6A, analogous to the area 290-8C previously described with reference to winding 510C. Stated another way, the net coupling area within the offset zone OZ-6A is an unbalanced net coupling area and the total coupling area within that offset zone is less than the largest of any portion of a single loop area that is included in any offset zone of that winding (or any portion of a standard loop area). Thus it will be appreciated that the different shape and lost discrepancy area 290-6A creates a net unbalanced coupling area in the offset zones that will create a small phase error in the signal from the winding 510A.

In winding 510B, offset zones OZ-4B through OZ-6B each include a standard shaped portion of a +loop balanced against a standard shaped portion of a –loop and ideally contribute no phase error. Offset zone OZ-9B includes a standard shaped portion of a +loop, and may be considered to be balanced against the standard shaped portion of a –loop in offset zone OZ-1B, because it is located precisely an integer number of scale wavelengths away. Similarly, offset zone OZ-2B includes a standard-shaped portion of a +loop and may be considered to be balanced against the standard-shaped portion of a –loop in offset zone OZ-8B. Winding 510B further includes in offset zone OZ-3B a standard shaped portion of a –loop, which may be considered to be partially balanced against the irregularly-shaped subportion of a +loop in offset zone OZ-7B, which is located an integer number of wavelengths away. However, offset zone OZ-7B includes a net coupling area shape that is different from the shape of the standard loop portions in the other offset zones. In particular, offset zone OZ-7B is missing a +loop coupling area 290-7B, analogous to the area 290-8C previously described with reference to winding 510C. Stated another way, the net coupling area within the offset zone OZ-7B is an unbalanced net coupling area and the total coupling area within that offset zone is less than the largest of any portion of a single loop area that is included in any offset zone of that winding (or any portion of a standard loop area). Thus it will be appreciated that the different shape and lost discrepancy area 290-7B creates a net unbalanced coupling area in the offset zones that will create a small phase error in the signal from the winding 510BA.

It should be appreciated that the shape of the unbalanced coupling areas resulting from the atypical coupling shapes in the offset zones OZ-7B and OZ-3B of winding 510B are geometrically congruent to the shape of the unbalanced coupling areas resulting from the atypical coupling shapes in the offset zones OZ-6A and OZ-2A of winding 510A, and are also geometrically congruent to the shape of the unbalanced coupling areas resulting from the atypical coupling shapes in the offset zones OZ-8C and OZ-4C of winding 510C. Therefore, the phase error in the windings 510B, 510A, and 510C will be nominally identical. Therefore, since the phase error in each winding will be identical, the relative spatial phases between the windings will be as desired. Accordingly, a measurement error will not arise due to improper spatial phase relationships between the windings. Also, the windings 510A, 510B, and 510C each has the same overall length along the measuring axis direction. This additional aspect of geometric similarity between the windings may be advantageous for accuracy in various embodiments. In addition, in each of the windings, all of the polarity zones that include doubled loops are adjacent to one another, forming one spatial grouping (or "set") of doubled loops in each of the windings. This additional aspect of geometric similarity between the windings may be advantageous for accuracy in various embodiments.

In one specific embodiment the various features of the diagram of FIG. 6 are shown "true-to-scale," in that the sizes of the feedthroughs, conductive trace widths, clearances between conductive traces, loop sizes, and the like are depicted approximately realistically relative to one another and according to practical fabrication constraints. Accordingly, in various embodiments, the various shifting arrangements and series connection features are constrained to approximately the regions of the offset zones, because this is a region where they will not interfere with adjacent conductors that are present when the windings that have the different spatial phases are aligned to one another. In some embodiments, the wavelength of a transducer according to this invention may be approximately 15 times the diameter (or comparable size dimension) of the smallest feedthrough used in the serial connections that form a winding, or 10 times, or even less. In such cases, the associated layout constraints make the various combinations of balancing and/or shifting techniques disclosed herein particularly valuable. However, the techniques disclosed herein may also be used for longer wavelengths, of course.

It should be appreciated that although the foregoing embodiment includes unbalanced coupling areas in the offset zones that are geometrically congruent between the various respective windings (such that their respective phase errors are identical), in some embodiments making the unbalanced coupling areas geometrically congruent may be impossible or inconvenient due to various layout constraints. In such cases, it should be appreciated that making the unbalanced coupling areas in the offset zones approximately the same between windings may still improve the measurement accuracy of the set of windings in comparison to known windings. For example, if the net unbalanced coupling area in the respective offset zones of each respective winding differs between windings by at most one-eighth of the largest portion of any single loop area that is included in an offset zone of any one of the windings, then their respective phase errors will typically be similar enough to provide improved accuracy compared to the prior art. When the latter condition is fulfilled, the phase error difference between windings may be less than 2 or 3 milliradians in some embodiments. When the unbalanced coupling areas in the offset zones are geometrically congruent between the various windings, the phase error differences between windings may be as small as 1 milliradian, one-half milliradian, or even less, in some embodiments.

FIG. 7 is a plan view of a practical set of transducer windings 700 used in a pitch-compensated three-phase transducer readhead according to this invention. The set of windings 700 is configured to avoid the subtle spatial phase errors present in the prior art set of windings 300, discussed previously. However, several features of the windings 700 are similar to those discussed previously with reference to similarly designated features in FIGS. 3-6, and such features may be understood by analogy with previous descriptions. Therefore, only those features which require additional explanation are described in detail below.

Figure 8:
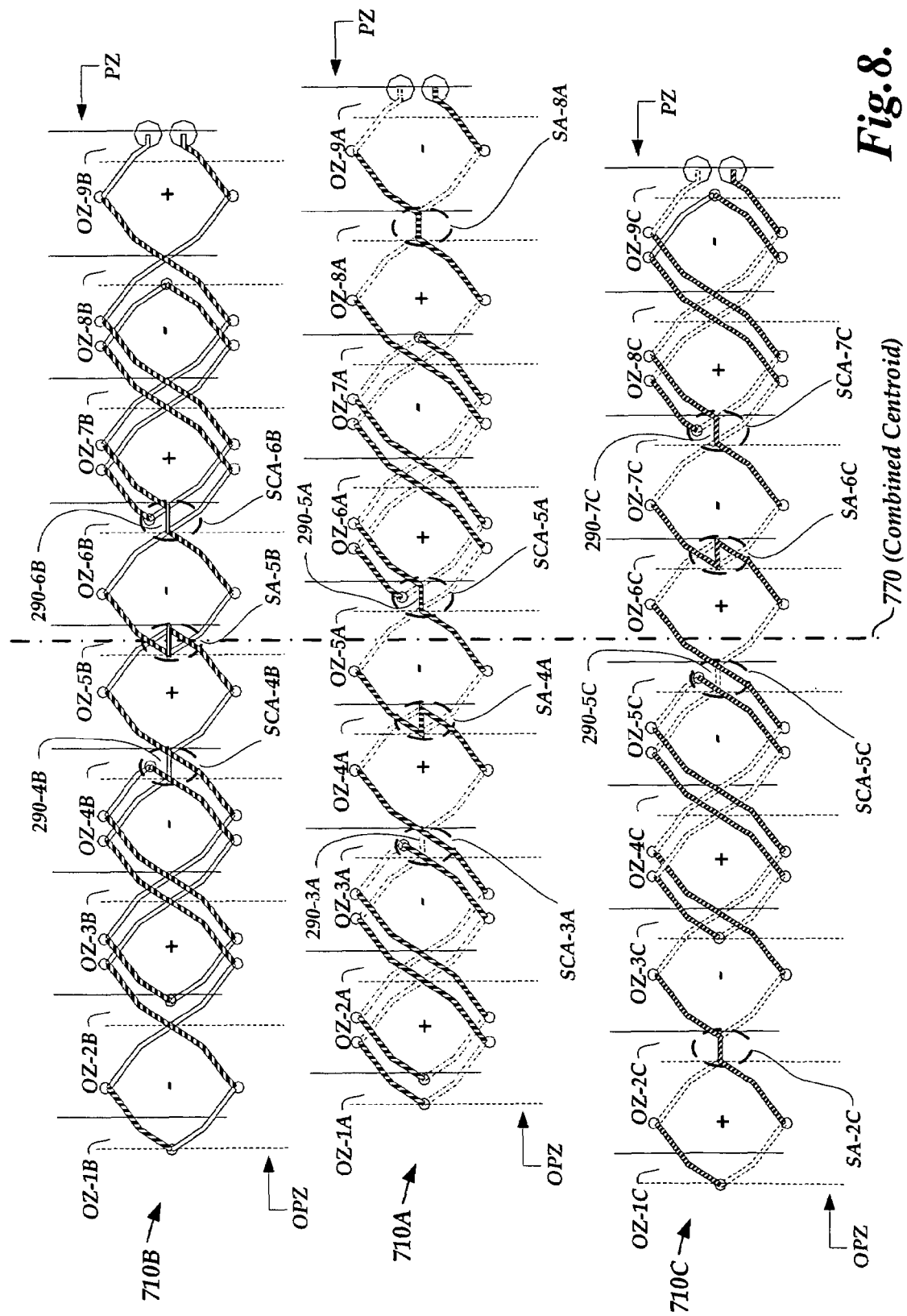
FIG. 8 is a plan view of the three windings of FIG. 7, showing each individually.

FIG. 8 is a plan view of the three windings 710A-710C of FIG. 7, showing each individually. The centroids of all the windings are aligned along the combined centroid axis 770, to provide pitch compensation according to previously described principles. Similarly to the windings 300 and 500, in considering phase error contributions, for the windings shown in FIGS. 7 and 8, we may restrict our attention to the offset zones, since each of the windings includes a basic loop set of six loops balanced against an offset loop set of six loops, and all deviations from the "ideal" or standard loop shape for the set of windings 700 are located in the offset zones.

In particular, in winding 710C, offset zones OZ-3C, OZ-4C, and OZ-8C each includes a standard-shaped portion of a +loop balanced against a standard-shaped portion of a −loop and ideally contribute no phase error. Offset zone OZ-9C includes a standard shaped portion of a −loop and may be considered to be balanced against the standard shaped portion of a +loop in offset zone OZ-1C, located an integer number of scale wavelengths away. The offset zones OZ-2C and OZ-6C each includes "self-balancing" shifting arrangements that contribute no phase error, similarly to those previously described with reference to FIG. 6. Offset zone OZ-7C includes a net coupling area shape that is different from the shape of the standard loop portions in the majority of the other offset zones. In particular, offset zone OZ-7C is missing a +loop coupling area 290-7C. However, offset zone OZ-5C includes a net coupling area shape that is a mirror image of that shown in offset zone OZ-7C and is missing an equivalent −loop coupling area 290-5C. The mirror image reversal of the shape is irrelevant to its signal contribution as a function of displacement along the measuring axis, and the offset zones OZ-7C and OZ-5C are an integer number of wavelengths apart. Thus it will be appreciated according to previously described principles that the coupling shape and lost discrepancy area 290-7C in the offset zone OZ-7C ideally balances the lost discrepancy area 290-5C in the offset zone OZ-5C such that their combination is configured to contribute no net phase error.

Overall, it will be appreciated that in winding 710C any coupling area shape in one of the offset zones that is different than the standard coupling area shapes in the majority of the offset zones, is balanced by "similarly different" coupling area shape in one of the offset zones that is an integer number of wavelengths away or in the same offset zone. Thus, ideally, the winding 710C includes no phase error. The configuration of the winding 710A is essentially the same as that of the winding 710C, except that winding 710A is "reversed horizontally" in comparison to the winding 710C (except for the output terminals). Thus, the configuration of the winding 710A may be understood based on the previous description of winding 710C. Similarly, the winding 710A includes no phase error.

In winding 710B, offset zones OZ-3B and OZ-7B each include a standard shaped portion of a +loop balanced against a standard shaped portion of a−loop, and ideally contribute no phase error. Offset zones OZ-9B and OZ-2B each include a standard shaped portion of a +loop, which may be considered to be balanced against the standard shaped portion of a −loop in offset zones OZ-1B and OZ-8B, located an integer number of scale wavelengths away, respectively. The offset zone OZ-5B includes a "self-balancing" shifting arrangement that contributes no phase error, similarly to a shifting arrangement described with reference to FIG. 6. Offset zone OZ-6B includes a net coupling area shape that is different from the shape of the standard loop portions in the majority of the other offset zones. In particular, offset zone OZ-6B is missing a +loop coupling area 290-6B. However, offset zone OZ-4B includes a net coupling area shape that is a mirror image of that shown in offset zone OZ-6B and is missing an equivalent −loop coupling area 290-4B. The offset zones OZ-6B and OZ-4B are an integer number of wavelengths apart. Thus, the coupling shape and lost discrepancy area 290-6B in the offset zone OZ-6B ideally balances the lost discrepancy area 290-4B in the offset zone OZ-4B such that their combination is configured to contribute no net phase error. Overall, it will be appreciated that in winding 710B any coupling area shape in one of the offset zones that is different than the standard coupling area shapes in the majority of the offset zones, is balanced by a "similarly different" coupling area shape in one of the offset zones that is an integer number of wavelengths away or in the same offset zone. Thus, ideally, the winding 710B includes no phase error.

Therefore, since there is no phase error in any of the windings 710A-710C, the phase error (no phase error) in each winding is the same. Accordingly, the relative spatial phases between the windings will be as desired. Accordingly, a measurement error will not arise due to improper spatial phase relationships between the windings. Also, the windings 710A, 710B, and 710C each has the same overall length along the measuring axis direction. This additional aspect of geometric similarity between the windings, may be advantageous for accuracy in various embodiments. In addition, in each of the windings, two polarity zones that include doubled loops are adjacent to one another, forming a first spatial grouping (or first "set") of doubled loops in each of the windings. In addition, two other polarity zones that include doubled loops are adjacent to one another, forming a second spatial grouping (or second "set") of doubled loops in each of the windings. This additional aspect of geometric similarity between the windings, that is, having the same number of groups or sets of adjacent doubled loops in each winding, may be advantageous for accuracy in various embodiments.

Figure 9:
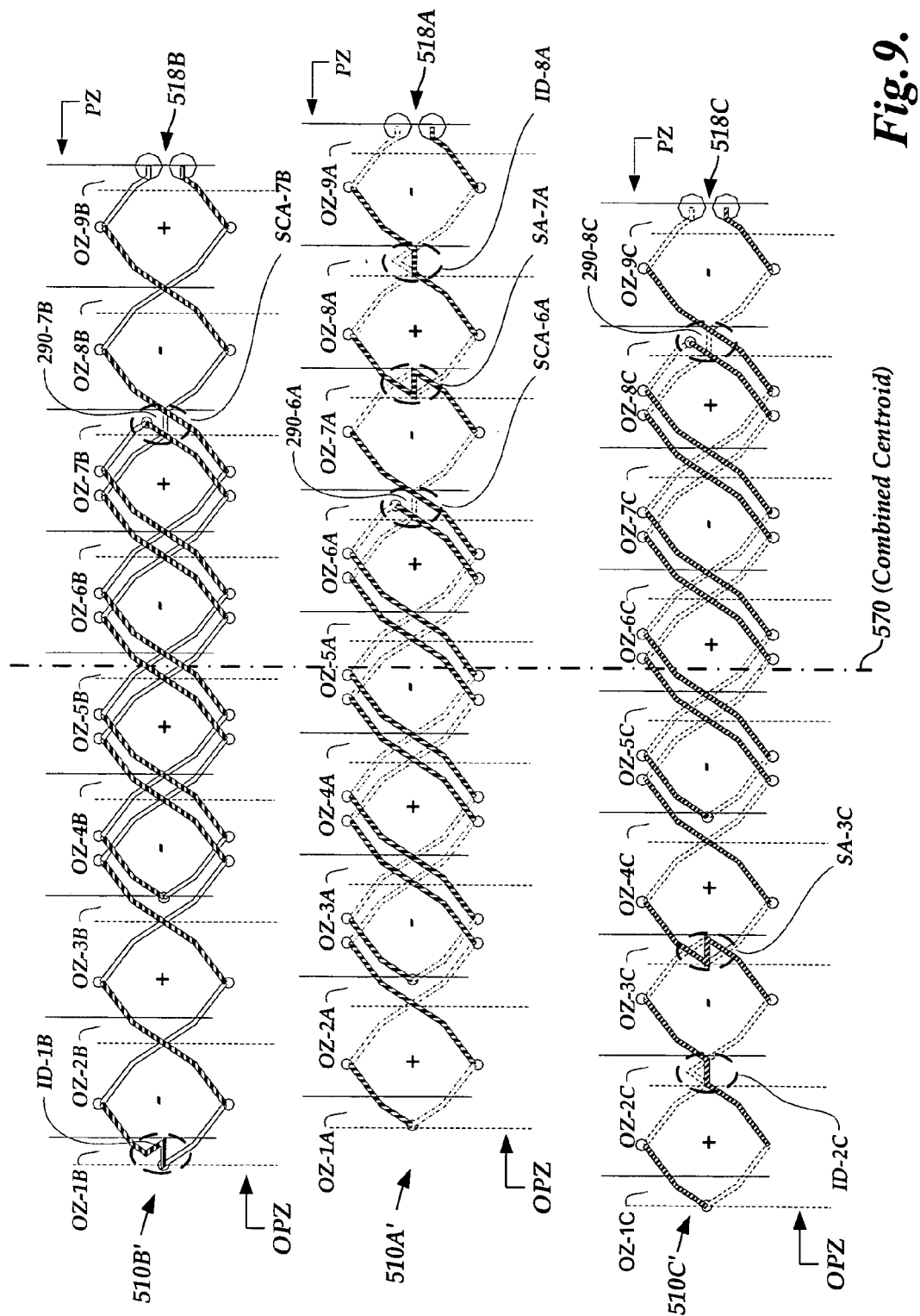
FIG. 9 is a plan view of the three windings of FIG. 6, showing a novel means of phase error compensation.

FIG. 9 is a plan view of the three windings 510A'-510C', which are the same as the windings 510A-510C of FIG. 6, but each including a novel means of phase error adjustment. As previously described, each of the windings 510A-510C of FIGS. 5 and 6 includes a phase error due to the area discrepancies 290-6A, 290-7B, and 290-8C, respectively. In various embodiments, it may be desirable that each winding in a set have nominally no phase error. Therefore, windings 510A'-510C' show added intentional discrepancies ID-8A, ID-1B, and ID-2C, respectively. Intentional discrepancies ID-8A and ID-2C each creates additional +coupling areas to "replace" the lost +coupling areas 290-6A and 290-8C, respectively. As a result, the windings 510A' and 510C' include no phase error. The intentional discrepancies ID-8A and ID-2C may be described as shifting arrangements that include coupling area of a single polarity, in contrast to the self-balancing shifting arrangements of the windings 500 that they have replaced. Intentional discrepancy ID-1B removes −coupling area, to balance the lost +coupling areas 290-7B. As a result, the winding 510B' includes no phase error. The intentional discrepancy ID-1B may be described as a compensating single loop distortion, because it is formed in a single loop that may otherwise have a standard loop shape. It will be appreciated that in some embodiments, a single loop distortion may add compensating area to a loop, rather than subtract compensating area from a loop, if needed.

As a result of the balancing elements described above, there will be no phase error in any of the windings 510A'-510C'. In addition, nominally the +loop coupling area balances the −loop coupling area in each winding, eliminating the DC offset that would be present in the signals of the windings 510A-510C of FIG. 6. Additive or subtractive balancing discrepancies such as those shown in FIG. 9, or according to similar principles, may generally be used as needed in a variety of configurations according to this invention. It will be appreciated that in some embodiments, rather than creating a configuration with no phase error, the same type of intentional discrepancies illustrated in FIG. 9 may be used to intentionally create a phase error in one winding that matches a phase error present in another winding.

Figure 10:
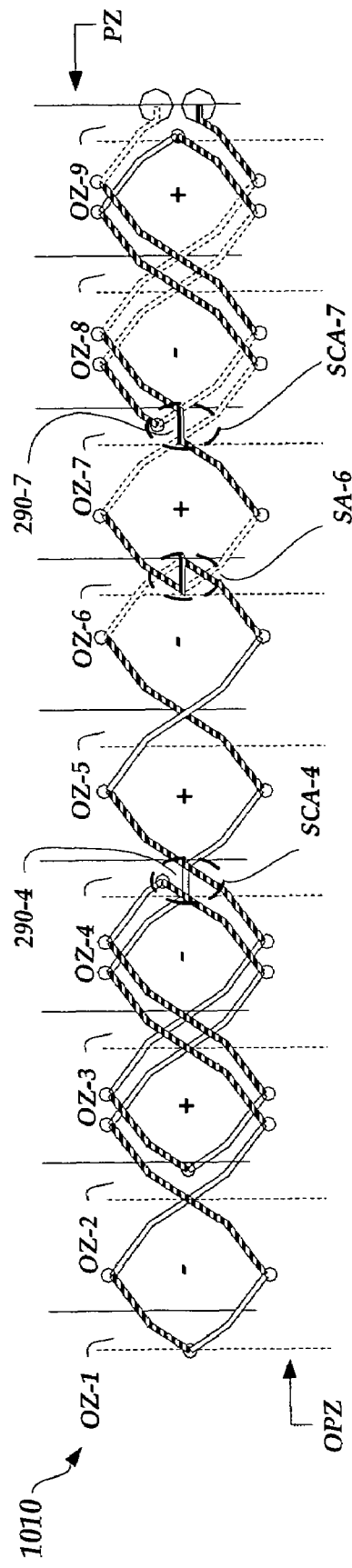
FIG. 10 is a plan view of a practical transducer winding according to this invention, with mirror image series connections arrangements and no net phase error.

FIG. 10 is a plan view of a practical transducer winding 1010 according to this invention, with mirror image series connections arrangements SCA-4 and SCA-7, which produces no net phase error. In winding 1010, offset zones OZ-3 and OZ-8 each includes a standard shaped portion of a +loop balanced against a standard shaped portion of a −loop, and ideally contribute no phase error. Offset zone OZ-5 includes a standard shaped portion of a +loop, which may be considered to be balanced against the standard shaped portion of a −loop in offset zone OZ-1, located an integer number of scale wavelengths away. The offset zone OZ-6 includes a "self-balancing" shifting arrangement that contributes no phase error, similarly to a shifting arrangement described with reference to FIG. 6.

The configuration of coupling areas in the offset zones OZ-7 and OZ-9, and OZ-4 and OZ-2 operate differently than previously described configurations. Offset zone OZ-7 includes an unbalanced net coupling area having a shape that is different from the shape of the standard loop portions in the majority of the other offset zones. In particular, offset zone OZ-7 is an unbalanced −loop coupling area, "missing" a −loop coupling area 290-7, in comparison to a standard coupling loop. Stated another way, the net coupling area within the offset zone OZ-7 is an unbalanced net coupling area and the total coupling area within that offset zone is less than the largest of any portion of a single loop area that is included in any offset zone of that winding (or any portion of a standard loop area). The standard shaped portion of a +loop in offset zone OZ-9 may be considered to be balanced against the −loop coupling area in offset zone OZ-7, except for the "missing" −loop coupling area 290-7 located an integer number of scale wavelengths away. The combination of coupling areas in the offset zones OZ-7 and OZ-9 includes a net unbalanced coupling area, which may be considered to be the triangular +loop area in OZ-9 that is "unmatched" by the "missing" −loop coupling area 290-7. Similarly, the combination of coupling areas in the offset zones OZ-2 and OZ-4 includes a net unbalanced coupling area, which may be considered to be the triangular +loop area in OZ-2 that is "unmatched" by the "missing" −loop coupling area 290-4, an integer number of scale wavelengths away in offset zone OZ-4. Importantly, the "unmatched" triangular +loop areas in OZ-2 and OZ-9 are an odd number of half-wavelengths apart, of the same polarity and of identical shape and area (the complements of the areas 290-4 and 290-7, respectively). Therefore, as scale elements that are nominally one-half wavelength long and that are arranged with a one wavelength period are displaced relative to the winding 1010, the unmatched coupling areas in the offset zones OZ-2 and OZ-9 (that are an odd number of half-wavelengths apart) will complement each other to produce a constant signal component. That is, as part of the unmatched coupling area in the offset zone OZ-2 is covered by a scale element, an identical part of the unmatched coupling area in the offset zone OZ-9 will be uncovered, and vice-versa. It will be appreciated that the "missing" −loop areas 290-4 and 290-7 are also an odd number of half-wavelengths away from one another. Also, the shape and area of the configuration of the offset zones OZ-2 and OZ-4 is the mirror image of the configuration of the offset zones OZ-7 and OZ-9. Thus, any phase error that may be associated with the configuration of the offset zones OZ-2 and OZ-4 will be nullified by an equal and opposite phase error associated with the configuration of the offset zones OZ-7 and OZ-9.

The winding 1010 generally produces no net phase error. A disadvantage of the configuration of 1010 is that the net amount of plus coupling loop area and the net amount of minus coupling loop area may be different. Therefore, the winding 1010 may have a generally undesirable DC signal offset. However, as previously indicated, DC signal offset may be relatively easily compensated by signal processing. Therefore, the previously described configuration of the winding 1010 may be useful in various applications.

It should be appreciated that in any of the configurations shown in FIGS. 5-10 or in any other winding configuration according to this invention, the offset dimension may be nominally equivalent to 1/10 of the scale wavelength. In such a case, the spatial filtering associated with this offset dimension will substantially eliminate any fifth spatial harmonic error component from the output signals of the windings.

It should also be appreciated that although the foregoing embodiments show three-phase systems, the various phase error balancing and/or elimination techniques described herein may generally be applied to two-phase systems (e.g., quadrature type systems) or, more generally, systems comprising any number of spatial phases.

While the preferred embodiment of the invention has been illustrated and described, numerous variations in the illustrated and described arrangements of features will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A pitch-compensated induced current position transducer, comprising:
   a first member including a plurality of scale elements arranged periodically along a scale track according to a scale wavelength, the scale track aligned with a measuring axis direction;
   a second member positioned adjacent to the first member, and at least one of the first and second members movable relative to the other along the measuring axis direction;
   at least one magnetic field generator positioned on the second member for generating a changing magnetic flux; and
   at least one magnetic flux sensor positioned on the second member to couple to the changing magnetic flux of the at least one magnetic field generator, the coupling to the changing magnetic flux influenced by the scale elements arranged periodically along the scale track, and the magnetic flux sensor comprising a plurality of windings overlapping one another and aligned along the scale track, each winding comprising:
 a first set of loops including loops of plus polarity and loops of minus polarity, the first set of loops arranged to correspond to a plurality of hypothetical basic polarity zones that alternate in polarity periodically along the measuring axis at the scale wavelength;
 a second set of loops including loops of plus polarity and loops of minus polarity, the second set of loops arranged to correspond to a plurality of hypothetical offset polarity zones that alternate in polarity periodically along the measuring axis at the scale wavelength;
 wherein:
  the offset polarity zones are offset from the basic polarity zones along the measuring axis direction by an offset dimension that is less than half the scale wavelength;
  respective hypothetical offset zones are defined along the entire length of each respective winding at positions along the measuring axis direction where a basic polarity zone overlaps with an offset polarity zone having the opposite polarity, and
 a conductive portion of the winding that forms the first set of loops is connected to a conductive portion of the winding that forms the second set of loops by a series connection;
 wherein:
 each of the plurality of windings includes at least one offset zone wherein a net coupling area within that offset zone is an unbalanced net coupling area, and a total coupling area within that offset zone is less than the largest of any portion of a single loop area that is included in any offset zone of that winding; and
 the plurality of windings is configured such that the phase error of each respective winding of the plurality of windings is approximately the same.

2. The transducer of claim 1, wherein the net amount of unbalanced coupling area in the respective offset zones of each respective winding is approximately the same for each respective winding of the plurality of windings.

3. The transducer of claim 2, wherein the net amount of unbalanced coupling area in the respective offset zones of each respective winding differs between windings by at most one-eighth of the largest portion of any single loop area that is included in an offset zone of any one of the windings.

4. The transducer of claim 3, wherein the shape of the net unbalanced coupling area in each of the respective windings is geometrically congruent between each of the respective windings.

5. The transducer of claim 1, wherein the net amount of unbalanced coupling area in the respective offset zones of each respective winding is approximately zero.

6. The transducer of claim 1, wherein:
 the unbalanced coupling area of one of the plurality of windings is located in an unbalanced offset zone that is adjacent to a polarity zone of that winding that includes a majority of the coupling area of two loops, and the unbalanced coupling area is located along the measuring axis in a first direction relative to the two loops; and
 each of the other windings of the plurality of windings includes an unbalanced coupling area that is located in an unbalanced offset zone that is adjacent to a polarity zone of that winding that includes a majority of the coupling area of two loops, and that unbalanced coupling area is located along the measuring axis in the first direction relative to the two loops.

7. The transducer of claim 1, wherein at least one of the windings includes a shifting arrangement in one of its offset zones that includes no coupling area.

8. The transducer of claim 1, wherein at least one of the windings includes a shifting arrangement that includes coupling area of a single polarity in one its offset zones.

9. The transducer of claim 8, wherein the coupling area of the single polarity balances an otherwise unbalanced coupling area of the opposite polarity in an offset zone an integer number of wavelengths away.

10. The transducer of claim 1, wherein at least one of the windings includes a compensating single-loop distortion in one of its offset zones that balances an otherwise unbalanced coupling area in an offset zone an integer number of wavelengths away.

11. The transducer of claim 1, wherein in each winding, all polarity zones that each contain the majority of the coupling area of two windings are located adjacent to one another.

12. The transducer of claim 11, wherein the number of members in the first set of loops is the same for each of the plurality of windings, and the number of members in the second set of loops is the same for each of the plurality of windings.

13. The transducer of claim 12, wherein the number of members in the first set of loops is the same as the number of members in the second set of loops.

14. The transducer of claim 1, wherein each winding includes:
 a first group of polarity zones that each contain the majority of the coupling area of two windings and that are located adjacent to one another; and
 at least one other polarity zone that contains the majority of the coupling area of two windings and that is separated from the first group of polarity zones by at least one polarity zone that does not include the majority of the coupling area of two windings.

15. The transducer of claim 1, wherein each winding includes two serial connection arrangements in its offset zones that are configured as mirror images of one another.

16. The transducer of claim 1, wherein the two serial connection arrangements that are configured as mirror images of one another are in offset zones that are an integer number of wavelengths apart.

17. The transducer of claim 1, wherein the offset dimension is one-tenth of the scale wavelength.

18. The transducer of claim 1, wherein the plurality of windings consists of N windings that provide respective output signals having relative spatial phases that differ by (360/N) degrees, wherein N is an integer that is at least two.

19. The transducer of claim 18, wherein N=3.

20. The transducer of claim 1, wherein the plurality of windings is configured such that the centroids of each of the plurality of windings are approximately aligned at the same location along the measuring axis direction.

21. The transducer of claim 1, wherein each of the plurality of windings includes portions that are connected by feedthroughs that have a minimum feedthrough size dimension parallel to the plane of the winding and the scale wavelength is at most 10 times that minimum feedthrough size dimension.

22. The transducer of claim 1, wherein:

at least one of the plurality of windings includes first and second offset zones that include first and second unbalanced net coupling areas, respectively, and a total coupling area within each of the first and second offset zones is less than the largest of any portion of a single loop area that is included in any offset zone of that winding;

the first and second unbalanced net coupling areas have the same shape and area; and the first and second offset zones that include first and second unbalanced net coupling areas are an odd number of half-wavelengths apart.

23. The transducer of claim 22, wherein the first and second unbalanced net coupling areas are included in two serial connection arrangements that are configured as mirror images of one another.

* * * * *